United States Patent [19]

Yamamoto

[11] Patent Number: 4,941,682
[45] Date of Patent: Jul. 17, 1990

[54] ADJUSTING MECHANISM FOR WEBBING-SUPPORTING MEMBER IN PASSIVE SEAT BELT SYSTEM

[75] Inventor: Kazuo Yamamoto, Kanagawa, Japan

[73] Assignee: Nippon Seiko Kabushiki Kaisha, Tokyo, Japan

[21] Appl. No.: 318,061

[22] Filed: Mar. 1, 1989

[30] Foreign Application Priority Data

Mar. 1, 1988 [JP] Japan .................................. 63-48507

[51] Int. Cl.⁵ .............................................. B60R 22/06
[52] U.S. Cl. .................................... 280/804; 297/483; 280/808
[58] Field of Search ............... 280/804, 808, 801, 807, 280/803; 297/468, 473, 483, 486

[56] References Cited

U.S. PATENT DOCUMENTS

| | | |
|---|---|---|
| 4,398,751 | 8/1983 | Wahlmann et al. ................. 280/808 |
| 4,500,115 | 2/1985 | Ono ..................................... 280/808 |
| 4,579,368 | 4/1986 | Kawade et al. ..................... 280/808 |
| 4,598,951 | 7/1986 | Ono ..................................... 297/483 |
| 4,711,468 | 12/1987 | Yoshitsugu .......................... 280/804 |
| 4,720,147 | 1/1988 | Takada ................................ 297/472 |
| 4,750,758 | 6/1988 | Yamamoto et al. ................ 280/804 |
| 4,776,611 | 10/1988 | Tamura ............................... 280/804 |

Primary Examiner—Richard A. Bertsch
Attorney, Agent, or Firm—Wegner & Bretschneider

[57] ABSTRACT

An adjusting mechanism for a webbing-supporting member in a passive seat belt system is constructed of an elongated member to be mounted on a vehicle body—such as a guide rail—, an anchor base transversely surrounding the elongated member, and a spacer provided between the elongated member and anchor base to substantially fill up a spacing between the elongated member and at least one of planar walls of the anchor base.

12 Claims, 10 Drawing Sheets

ADJUSTING MECHANISM FOR WEBBING-SUPPORTING MEMBER IN PASSIVE SEAT BELT SYSTEM

BACKGROUND OF THE INVENTION (1) Field of the Invention:

This invention relates to a passive seat belt system for a vehicle, which serves to restrain and protect an occupant in the event of a vehicular emergency such as a collision. Specifically, this invention is concerned with a device for permitting an upward or downward adjustment of an anchor base to choose a suitable point for a shoulder webbing in a motor-driven two-point passive seat belt system for an automotive vehicle.

(2) Description of the Related Art:

As illustrated in FIG. 11, a passive seat belt system for an automotive vehicle automatically restrains and protects an occupant by driving a slider 2, to which an occupant-restraining webbing 1 is fastened, with a motor 3 to cause the slider 3 to move between an occupant-releasing position and an occupant-restraining position along a slide rail 4 provided in the interior of the automotive vehicle.

The slider 2 is designed to engage an anchor base 5 at the occupant-restraining position. The anchor base 5 is located on a center pillar 7 of a vehicle body and serves to transmit a load, which is applied upon collision, to a body of the automotive vehicle, thereby supporting the occupant.

In such a passive seat belt system, it is necessary to adjust the height of the slider 2 approximately to the position of the outboard shoulder of the occupant at the occupant-restraining position. If the slider 2 is lower than his outboard shoulder, the webbing 1 extends over his outboard arm. On the other hand, if it is higher than his outboard shoulder, the webbing 1 extends over his face. It will therefore be impossible to protect the occupant safely in the event of an emergency.

To permit adjustment of the slider-fixing point to a suitable height, an anchor base adjusting mechanism is used to move and position the anchor base 5 as shown in FIG. 12. The anchor base adjusting mechanism is used in the following manner. The slider 2 is first of all moved to the occupant-releasing position. The anchor base 5 is then shifted either upward or downward along the slide rail 4 mounted on the center pillar 7 of the vehicle body, whereby the position of the anchor base 5 is adjusted. In the center pillar 7, there are formed positioning holes 8 and a load-receiving slot 9 as depicted in FIG. 13. By choosing one of the positioning holes 8, the height of slider 2, namely, the position of the upper end of the shoulder webbing 1 is adjusted.

When viewed from the front of the automotive vehicle by way of example, the center pillar 7 of the vehicle body does not extend linearly in the vertical direction but extends vertically in a pattern curved outboard with a large radius of curvature. It is therefore necessary to bring the configurations of members, such as the slide rail 4 attached to the center pillar 7 and the anchor base 5 provided along the length of the slide rail 4, into conformity with the curved shape of the vehicle body. If the anchor base 5 is linear in spite of the curved configuration of the slide rail 4, the anchor base 5 cannot be shifted or even if its shifting is feasible, the shifting is by no means smooth.

The anchor base 5 has heretofore been fabricated by bending an iron plate into conformity with the curved configuration of the center pillar 7 of the vehicle body. However, such bending of an iron plate is very difficult and is accompanied by a drawback that the resulting anchor base is costly.

SUMMARY OF THE INVENTION

The present inventor has carried out an extensive investigation with a view toward solving the above problem. As a result, it has been found an economical anchor base having a linear configuration along the length thereof can be used successfully provided that a spacer is interposed between the anchor base and its associated slide base, leading to completion of the present invention.

In one aspect of this invention, there is thus provided an adjusting mechanism for a webbing-supporting member in a passive seat belt system. The mechanism comprises:

an elongated member to be mounted on a vehicle body, said elongated member being bent with a predetermined radius of curvature in the direction of thickness thereof, said direction being transverse to the length of the vehicle body;

an anchor base transversely surrounding the elongated member, movable along the length of the elongated member and adapted to support a member to which a webbing is fastened, said anchor base having a pair of planar walls extending in parallel to each other as front and rear walls as viewed in the direction of the thickness of the elongated member; and a spacer provided between the elongated member and anchor base to substantially fill up a spacing between the elongated member and at least one of the planar walls of the anchor base.

The interposition of the resilient spacer between the slide rail and the anchor base allows to form the anchor base in a linear configuration, so that the fabrication of the anchor base is facilitated. Accordingly, an anchor base adjusting mechanism permitting smooth shifting of an anchor base can be provided at a lower cost.

BRIEF DESCRIPTION OF THE DRAWINGS

The above and other objects, features and advantages of the present invention will become apparent from the following description and the appended claims, taken in conjuction with the accompanying drawings, in which:

FIGS. 3 and 4 are views taken in the direction indicated by arrow Y of FIG. 1, in which FIG. 3 shows that a knob has been operated and a latch has been rendered out of engagement with a center pillar while FIG. 4 illustrates that the latch is in engagement with the center pillar;

DETAILED DESCRIPTION OF THE INVENTION AND PREFERRED EMBODIMENTS

Figure 1:
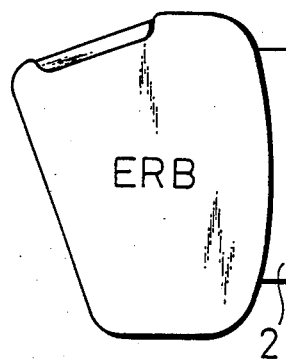
FIG. 1 is a plan view of an anchor base and a slide rail.
Figure 1:
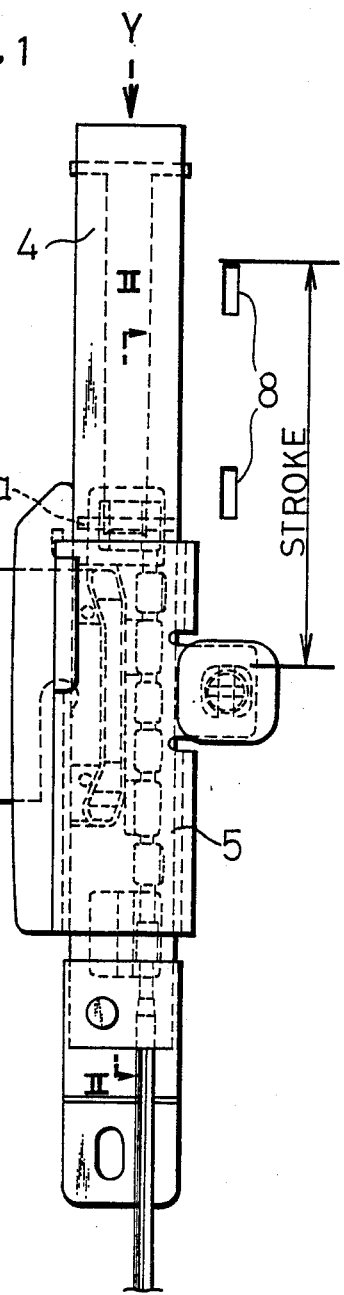

FIG. 1 illustrates an anchor base adjusting mechanism for a passive seat belt system. An anchor base 5 is provided on an end portion of a slide rail 4 as an extended member, said end portion being on the side of a center pillar, whereby at an occupant-restraining position of an associated webbing, the slider 2 is maintained in engagement with the anchor base 5. The anchor base 5 is allowed to move upward and downward while being guided by the slide rail 4. Making use of holes 8 formed in the center pillar, the position of the anchor base 5 can be selected. The position-selecting holes 8 prevent the anchor base 5 from moving downward when a load is applied to the anchor base 5.

Figure 2:
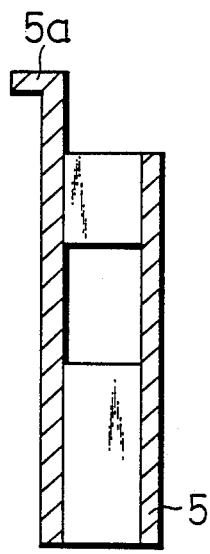
FIG. 2 is a cross-sectional view taken in the direction of arrows II—II of FIG. 1.

The anchor base 5 has such a shape as shown in FIG. 2 which is a cross-section taken in the direction of arrows II—II. A T-shaped bent anchor horn 5a is received in a slot 9 (see FIG. 5) which serves to receive loads. Pulling forces applied to the anchor base 5 are therefore transmitted to a vehicle body via the anchor horn 5a and slot 9. The anchor horn 5a is designed in such a way that it is normally kept out of contact with the vehicle body and hence not subjected to load but it serves to receive a load only in the event of a collision.

Figure 3:
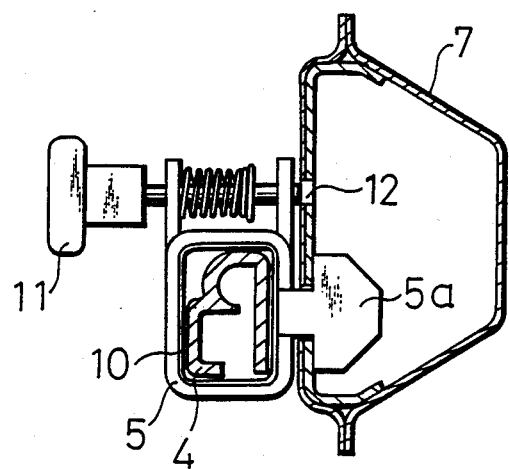
Figure 4:
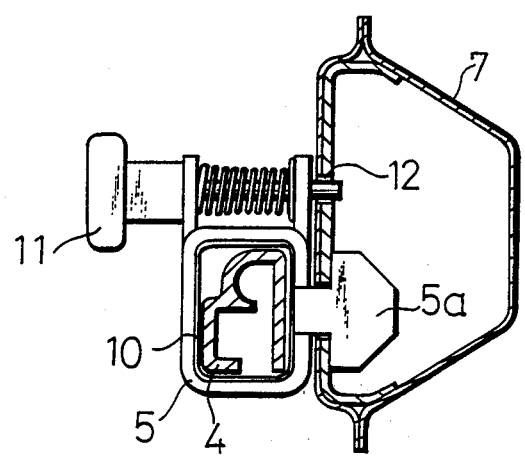

The cross-section of the anchor base 5 as viewed in direction Y is shown in FIGS. 3 and 4. In FIG. 3, a knob 11 has been pulled so that a latch 12 is out of engagement with the center pillar 7 and the anchor base is thus movable. In FIG. 4, the knob 11 has been allowed to return to its home position so that the latch 12 is in engagement with the center pillar 7 and the anchor base 5 is therefore fixed.

According to the present invention, a spacer 10 is interposed between the slide rail 4 and the anchor base 5 so that the anchor base 5 is allowed to move smoothly. The center pillar 7 of the vehicle body has such a configuration that it is bent with a large radius of curvature. The slide rail 4 has been fabricated in a configuration conforming the center pillar 7, in other words, is bent in the direction of the thickness of the slide rail 4, said direction being transverse to the length of the vehicle body. Therefore, the spacer 10 attached to the anchor base 5 has also been formed in a curved shape or in a shape such that it is allowed to pass the curved portion of the anchor base 5.

Figure 5:
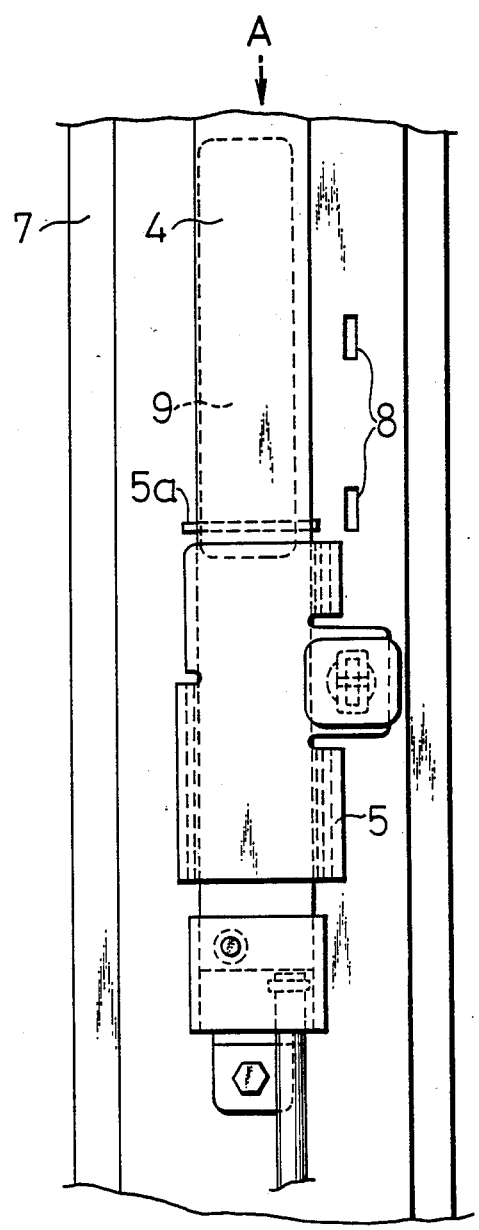
FIG. 5 is a plan view of an anchor base in an adjusting mechanism according to a first embodiment of this invention.
Figure 6:
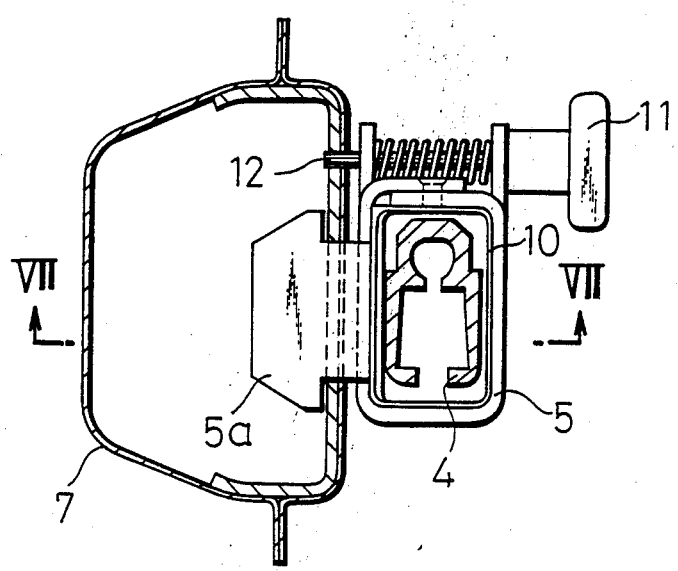
FIG. 6 is a view taken in the direction of arrow A of FIG. 5.
Figure 7:
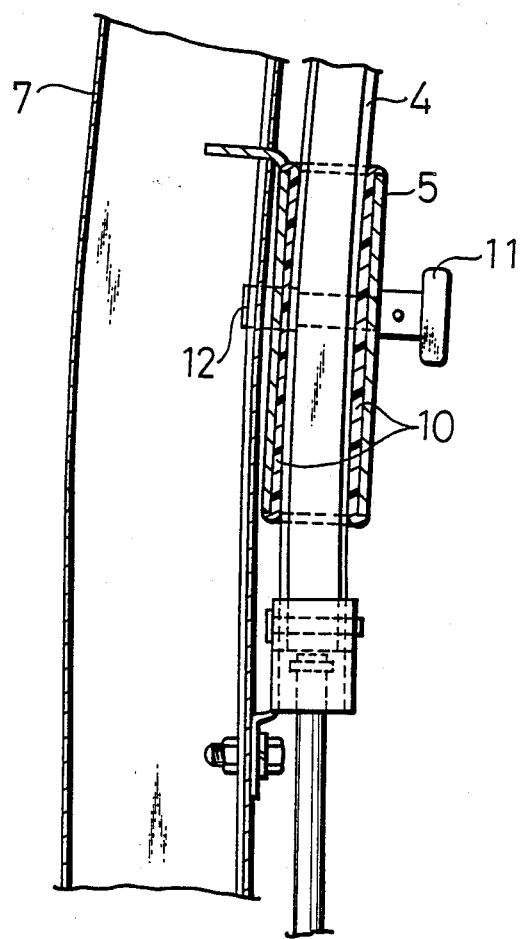
FIG. 7 is a cross-sectional view taken in the direction of arrows VII,VII of FIG. 6 and shows spacers having a configuration conforming with a curved slide rail.

FIG. 5 illustrates the anchor base 5, slide rail 4 and center pillar 7. FIG. 6 is a cross-sectional view seen in the direction of arrow A. FIG. 7 is a cross-sectional view taken in the direction of arrows VII,VII.

FIG. 7 shows the first embodiment of this invention. Spacers 10,10 are interposed between the slide rail 4 and the anchor base 5. As will become apparent when FIG. 2 is referred to, the anchor base 5 has a pair of flat walls which extend in parallel to each other and are front and rear walls as viewed in the direction of the thickness of the slide rail 4. Accordingly, each spacer 10 is formed in a planar configuration on the side of the anchor base but in a curved configuration conforming the curved configuration of the slide rail 4. The spacers 10,10 are made of a synthetic resin having a small coefficient of friction, so that the anchor base 5 is allowed to move smoothly on and along the slide rail 4.

Figure 8:
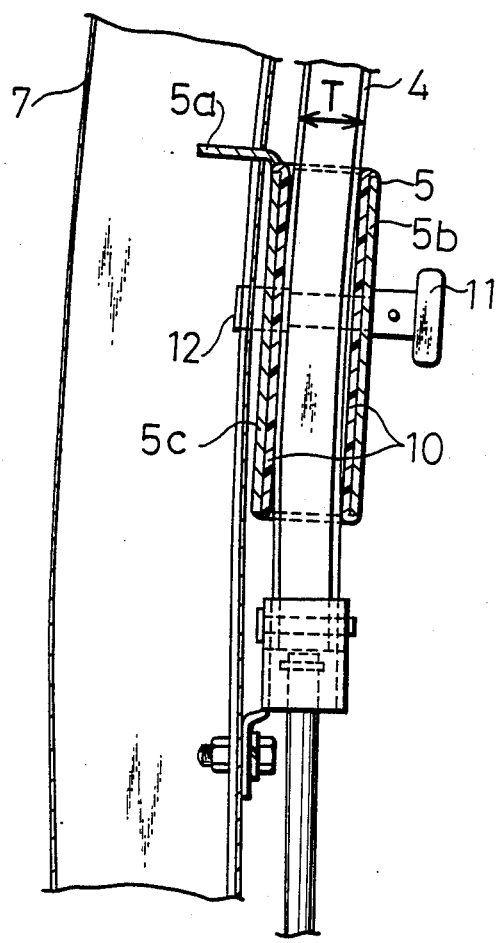
FIG. 8 is similar to FIG. 7, but depicts a second embodiment in which spacers have a linear configuration.

FIG. 8 illustrates the second embodiment of this invention. Each spacer 10 is formed planar on both surfaces thereof. In this embodiment, the distance between the spacers 10 and 10 is set somewhat greater than the thickness T of the rail 4 in the transverse direction of the vehicle. Owing to this inter-spacer distance, the spacer 10 on the side of an inboard wall 5b of the anchor base 5 is in contact with the rail 4 around both upper and lower end portions of the spacer 10 while the spacer 10 on the side of an outboard wall 5c is in contact with the rail 4 around the middle portion of the spacer 10 as viewed in FIG. 8.

Figure 9:
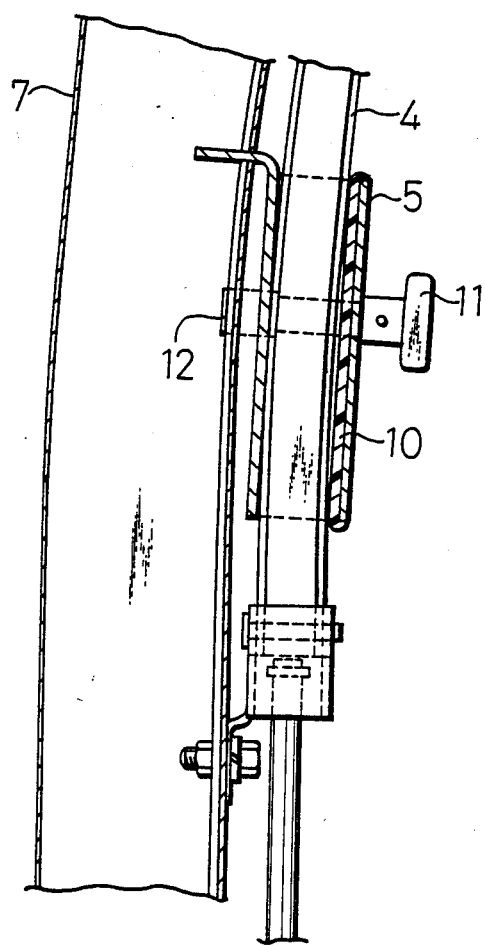
FIG. 9 is similar to FIG. 7, but illustrates a third embodiment in which a spacer is provided only on one side of an anchor base.

FIG. 9 depicts the third embodiment of this invention. A single spacer 10 is interposed only on the side of the concave wall of the slide rail 4. On the side of the convex wall of the slide rail 4, the anchor base 5 and slide rail 4 are in direct contact. On the side of the convex wall of the slide wall 4, the anchor base 5 is not caught by the slide rail 4 and is still allowed to move smoothly without interposition of a spacer although the friction becomes somewhat greater.

Figure 10:
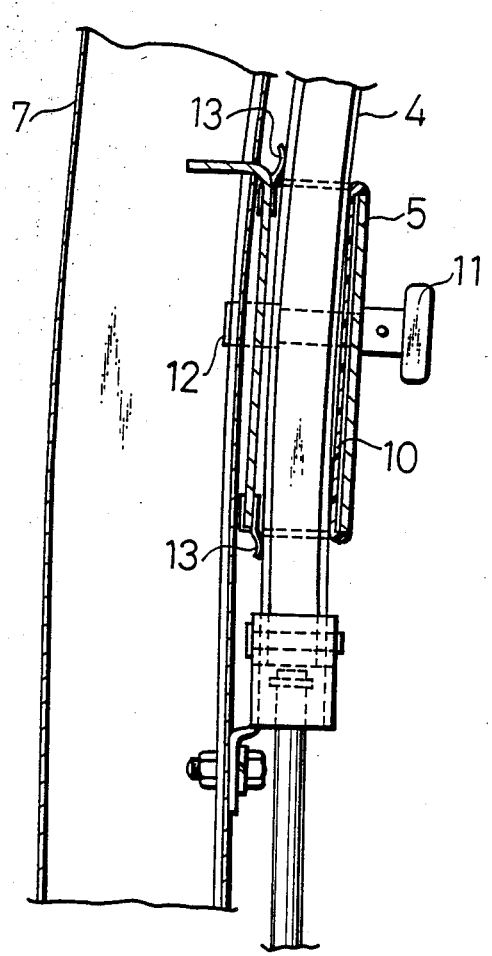
FIG. 10 is similar to FIG. 7, but illustrates a fourth embodiment in which a spacer is interposed on one side of an anchor base and a spring member is provided on the other side.
Figure 11:
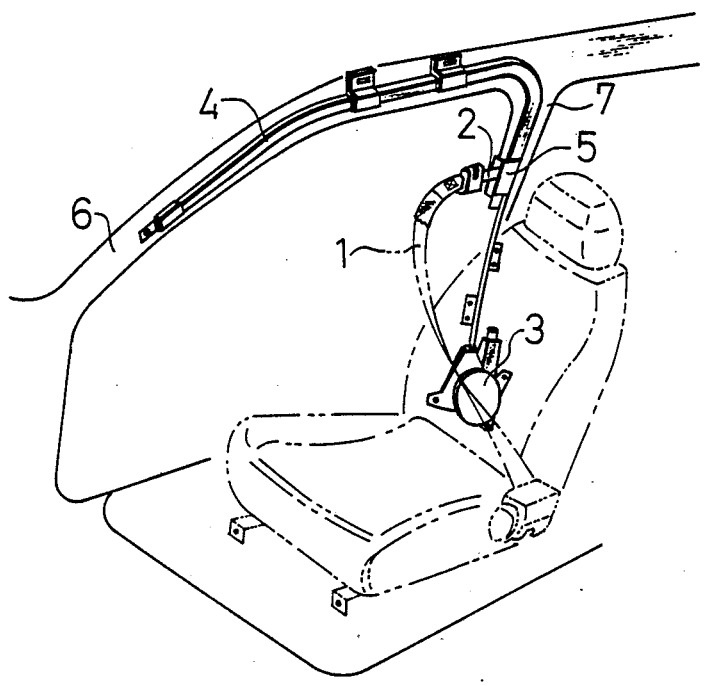
FIG. 11 is a schematic illustration showing the overall construction of a passive seat belt system.
Figure 12:
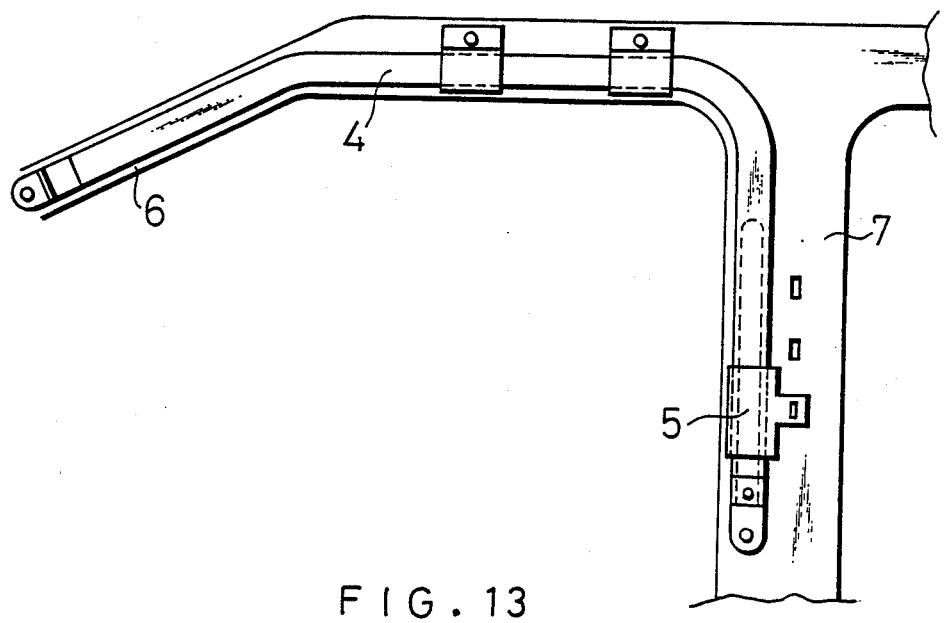
FIG. 12 illustrates only a slide rail and an anchor base.
Figure 13:
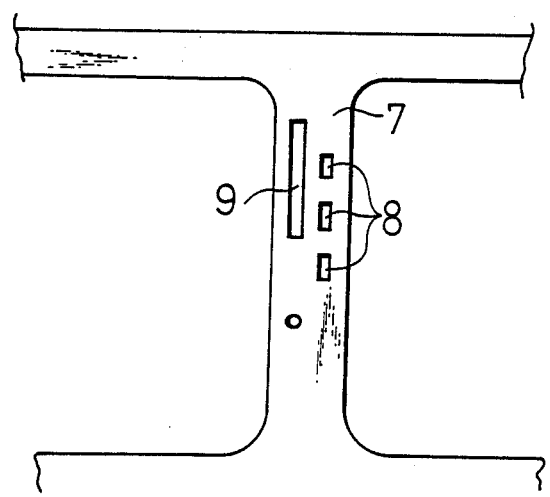
FIG. 13 shows a center pillar.

FIG. 10 shows the fourth embodiment of this invention. A single spacer 10 is interposed only on the side of the concave wall of the slide rail 4 and a spring member 13 is provided on the opposite side. The spring member 13 serves to prevent the anchor base 5 from rattling.

In each of the above embodiments, a passive seat belt system is thought of as a primary application target and a slide rail is thus used as an elongated member. The application target is however not necessarily limited thereto. When employed in an active seat belt system, a base member to be mounted on a vehicle body and defining engaged holes therein can be used as an elongated member. In such a case, a webbing-supporting member is provided on an anchor base, and a lock member for selectively engaging one of the engaged holes to position the anchor base at a desired location relative to the anchor base is provided with the anchor base.

I claim:

1. An adjusting mechanism for a webbing-supporting member in a passive seat belt system, comprising:

an elongated member to be mounted on a vehicle body, said elongated member being bent with a predetermined radius of curvature in a direction transverse to the length of the vehicle body;

an anchor base transversely surrounding the elongated member, movable along the length of the elongated member and adapted to support a member to which a webbing is fastened, said anchor base having a pair of planar walls extending straight in the direction of the length of the elongated member and in parallel to each other, whereby a spacing between the bent elongated member and at least one of the planar walls of the anchor base in the direction of the thickness of the elongated member varies along the length of the bent elongated member, reaching a maximum substantially at a longitudinal intermediate portion of the anchor base on a concave side of the elongated member and a maximum substantially at least one of longitudinal ends of the anchor base on a convex side of the elongated member; and a spacer provided between the elongated member and anchor base to substantially fill up the spacing between the elongated member and said at least one planar wall of the anchor base.

2. The mechanism as claimed in claim 1, wherein the spacer is provided on the side of at least one of convex and concave surfaces of the bent elongated member.

3. The mechanism as claimed in claim 2, wherein a surface of the spacer, said surface being brought into contact with said at least one of the convex and concave surfaces of the elongated member, is formed as a pair of curved surfaces spaced from each other by a distance substantially equal to the thickness of the elongated member.

4. The mechanism as claimed in claim 2, wherein a surface of the spacer, said surface being brought into contact with the anchor base, is formed as a flat surface.

5. The mechanism as claimed in claim 1, wherein the spacer is provided on the side of a concave surface of the bent elongated member.

6. The mechanism as claimed in claim 5, wherein a surface of the spacer, said surface opposing the elongated member, is formed as a flat surface and is in contact with the elongated member around both longitudinal end portions of the spacer.

7. The mechanism as claimed in claim 5, wherein a biasing means is provided on the side of a convex surface of the bent elongated member whereby the spacer is biased toward the elongated member.

8. The mechanism as claimed in claim 7, wherein the spacer is provided on the anchor base and the biasing means is provided between the anchor base and the elongated member.

9. The mechanism as claimed in claim 1, wherein the elongated member is a slide rail for movably guiding the member, to which the webbing is fastened, between an occupant-restraining position where the webbing restrains an occupant and an occupant-releasing position where the occupant is free from restrait by the webbing.

10. The mechanism as claimed in claim 1, further comprising a means for positioning the anchor base at a predetermined position.

11. The mechanism as claimed in claim 10, wherein the anchor base has an engaging portion adapted to engage the vehicle body to bear a load in the event of a vehicular emergency.

12. An adjusting mechanism for a webbing-supporting member in a passive seat belt system, comprising:
an elongated member to be mounted on a vehicle body, said elongate member being bent with a predetermined radius of curvature in the direction of thickness thereof, said direction being transverse to the length of the vehicle body;
an anchor base transversely surrounding the elongated member, movable along the length of the elongated member and adapted to support a member to which a webbing is fastened, said anchor base having a pair of planar walls extending in parallel to each other as front and rear walls as viewed in the direction of thickness of the elongated member;
a spacer provided between the elongated member and anchor base to substantially fill up a spacing between the elongated member and at least one of the planar walls of the anchor base;
wherein first and second spacers are provided on the sides of convex and concave surfaces of the bent elongated member respectively, surfaces of the first and second spacers, said surfaces opposing the convex and concave surfaces of the bent elongated member respectively, are flat surfaces extending in a paired and substantially parallel relation, the first spacer is located on the side of the convex surface of the elongated member and is in contact with the elongated member approximately at a longitudinal middle part of the first spacer, and the second spacer is located on the side of the concave surface of the elongated member and is in contact with the elongated member around both longitudinal and portions of the second spacer.

* * * * *